(12) United States Patent
Dixit

(10) Patent No.: US 11,724,566 B2
(45) Date of Patent: Aug. 15, 2023

(54) METHOD AND AN APPARATUS TO DETERMINING AN IMPACT ON A TEMPERATURE-CONTROLLED UNIT

(71) Applicant: Carrier Corporation, Palm Beach Gardens, FL (US)

(72) Inventor: Rajneesh Dixit, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/532,405

(22) Filed: Nov. 22, 2021

(65) Prior Publication Data

US 2022/0161631 A1 May 26, 2022

(30) Foreign Application Priority Data

Nov. 25, 2020 (IN) .............................. 202011051282

(51) Int. Cl.
 *B60H 1/00* (2006.01)
 *B60H 1/32* (2006.01)
(52) U.S. Cl.
 CPC ..... *B60H 1/00764* (2013.01); *B60H 1/00985* (2013.01); *B60H 1/3232* (2013.01)
(58) Field of Classification Search
 CPC ............ B60H 1/00764; B60H 1/00985; B60H 1/3232; B60H 1/00014; B60H 1/00978; B60H 1/3208; B60H 1/00585; F25D 29/003; G08C 17/02
 See application file for complete search history.

(56) References Cited

U.S. PATENT DOCUMENTS

2020/0074395 A1* 3/2020 Goldmann ............ F25D 11/003
2021/0293460 A1* 9/2021 Uehara ............... B60H 1/00978

FOREIGN PATENT DOCUMENTS

| EP | 3543817 A1 | 9/2019 | |
| WO | 2020129380 A1 | 6/2020 | |
| WO | WO-2020129380 A1 * | 6/2020 | ......... B60H 1/00978 |

OTHER PUBLICATIONS

European Search Report for Application No. 21210195.0; dated May 9, 2022; 7 Pages.

* cited by examiner

*Primary Examiner* — Sizo B Vilakazi
(74) *Attorney, Agent, or Firm* — Cantor Colburn LLP

(57) ABSTRACT

A server, an apparatus and a method for determining an impact on components of a temperature-controlled unit of a vehicle. The method includes receiving information of one or more parameters associated with one or more components of a temperature-controlled unit of a vehicle. Further, the information of the one or more parameters are received in response to a change in acceleration of the vehicle. The method also includes determining an impact on the one or more components of the temperature-controlled unit due to the change in the acceleration. The method further includes transmitting a notification to a device based on the impact on the one or more components of the temperature-controlled unit.

17 Claims, 10 Drawing Sheets

METHOD AND AN APPARATUS TO DETERMINING AN IMPACT ON A TEMPERATURE-CONTROLLED UNIT

FOREIGN PRIORITY

This application claims priority to Indian Patent Application No. 202011051282, filed Nov. 25, 2020, and all the benefits accruing therefrom under 35 U.S.C. § 119, the contents of which in its entirety are herein incorporated by reference.

TECHNICAL FIELD

The present disclosure generally relates to temperature-controlled units used in transportation systems. More particularly, the invention relates to an apparatus and a method for determining an impact on components of a temperature-controlled unit in a vehicle.

BACKGROUND

Perishable items or goods are usually kept inside a temperature-controlled unit of a vehicle to provide a favorable environment to prevent them from deteriorating during transportation. During transportation, roads may be damaged or may have slippery surface resulting in an accident or a collision of the vehicle with another object, like a vehicle. To control the vehicle on such occasions, hard brakes need to be applied by the driver that would result in sudden deceleration of the vehicle. However, sudden deceleration can cause damage to the temperature-controlled unit of the vehicle and eventually its operations can be hindered.

When the temperature-controlled unit gets damaged and its operations are hindered, a favorable environment cannot be provided to the perishable items or goods which may result in damaging them. Thus, it becomes important to determine the degree of damage to the temperature-controlled unit after sudden deceleration of the vehicle. Currently, there is no solution to inform the driver of the vehicle and/or the concerned person regarding damage to the temperature-controlled unit or about its hindered operations.

In view of the afore-mentioned problems, there is a need of an effective and efficient system and a method for determining damage to a temperature-controlled unit of a vehicle on application of hard brakes resulting in sudden deceleration. There is also a requirement to timely inform a person regarding the impact on the temperature-controlled unit. In order to solve the problems in the existing solutions, an apparatus, a server and a method are disclosed.

SUMMARY

Various embodiments of the invention describe a method for determining an impact on components of a temperature-controlled unit of a vehicle. The method comprises the step of receiving information of one or more parameters associated with one or more components of a temperature-controlled unit of a vehicle. Also, the information of the one or more parameters is received in response to a change in acceleration of the vehicle. The method further comprises the step of determining an impact on the one or more components of the temperature-controlled unit due to the change in the acceleration. The method also comprises the step of transmitting a notification to a device based on the impact on the one or more components of the temperature-controlled unit.

In an embodiment of the invention, the method also comprises the steps of determining one or more faults in the temperature-controlled unit based on the impact on the one or more components of the temperature-controlled unit.

In a different embodiment of the invention, the one or more faults are determined by comparing information of each parameter of the temperature-controlled unit with pre-determined values of the parameters.

In an embodiment of the invention, the method also comprises the steps of automatically initiating a recovery process for the one or more components based on the one or more faults determined in the temperature-controlled unit.

In another embodiment of the invention, the method also comprises the steps of storing information related to the detection of the change in acceleration and/or the one or more parameters associated with the one or more components in a memory. The information is erased from the memory in an event no impact is determined on the one or more components of the temperature-controlled unit due to the change in the acceleration.

In yet another embodiment of the invention, the one or more parameters associated with the one or more components are monitored by the temperature-controlled unit of the vehicle.

In another embodiment of the invention, the change in acceleration of the vehicle is detected using one or more sensors associated with the temperature-controlled unit.

In still another embodiment of the invention, the one or more sensors correspond to a tri-axis accelerometer sensor and a gyroscope.

In a different embodiment of the invention, the change in acceleration of the vehicle is detected in an event hard brakes of the vehicle are applied.

In yet another embodiment of the invention, the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

Various embodiments of the invention describe a server for determining an impact on components of a temperature-controlled unit of a vehicle. The server comprises a receiver, a determination unit and a transmitter. The receiver is configured to receive information of one or more parameters associated with one or more components of a temperature-controlled unit of a vehicle. Further, the information of the one or more parameters are received in response to a change in acceleration of the vehicle. The determination unit is configured to determine an impact on the one or more components of the temperature-controlled unit due to the change in the acceleration. The transmitter is configured to transmit a notification to a device based on the impact on the one or more components of the temperature-controlled unit.

In a different embodiment of the invention, the determination unit is further configured to determine one or more faults in the temperature-controlled unit based on the impact on the one or more components of the temperature-controlled unit.

In yet another embodiment of the invention, the one or more faults are determined by comparing information of each parameter of the temperature-controlled unit with pre-determined values of the parameters.

In an embodiment of the invention, the change in acceleration of the vehicle is detected using one or more sensors associated with the temperature-controlled unit. Further, the one or more sensors correspond to a tri-axis accelerometer sensor and a gyroscope.

In yet another embodiment of the invention, the change in acceleration of the vehicle is detected in an event hard brakes of the vehicle are applied.

In another embodiment of the invention, the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

In another different embodiment of the invention, an apparatus is disclosed. The apparatus comprises one or more sensors, a monitoring unit and a transmitting unit. The one or more sensors is configured to detect a change in acceleration of a vehicle, the one or more sensors associated with a temperature-controlled unit of the vehicle. The monitoring unit is configured to monitor one or more parameters associated with one or more components of the temperature-controlled unit in response to detection of the change in the acceleration. The transmitting unit is configured to transmit information of the one or more monitored parameters to a server to determine an impact on the one or more components of the temperature-controlled unit due to the change in the acceleration.

In a different embodiment of the invention, the one or more sensors associated with the temperature-controlled unit correspond to a tri-axis accelerometer sensor and a gyroscope.

In yet another embodiment of the invention, the change in acceleration of the vehicle is detected in an event hard brakes of the vehicle are applied.

In an embodiment of the invention, the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Described herein is the technology with an apparatus, a server and a method for determining an impact on components of a temperature-controlled unit of a vehicle and automatically initiating a recovery process for the one or more components having the impact thereon. The temperature-controlled unit of the vehicle may contain goods (such as pharmaceutical products, food items or other sensitive good). The apparatus may be integrated, embedded or plugged-in in the temperature-controlled unit. Further, the apparatus may detect a change in acceleration of the vehicle using one or more sensors. Such a change in the apparatus can be due to application of hard brakes by a driver to avoid an accident or a collision. On detecting the change in the acceleration, the apparatus may monitor one or more parameters associated with one or more components of the temperature-controlled unit. Accordingly, the apparatus may transmit information of the one or more monitored parameters to a server through a network. The server may then determine an impact on the one or more components of the temperature-controlled unit due to the change in the acceleration based on the information of the one or more monitored parameters.

As used herein, the vehicle may be a road vehicle (such as a two-wheeler, a three-wheeler, a four-wheeler), an air vehicle or a water vehicle (such as a ship) or any vehicle that is well known in the art.

As used herein, the apparatus may be a device or an electronic circuitry capable of monitoring the one or more parameters inside the temperature-controlled unit. The monitoring device may comprise, but is not limited to, sensors such as accelerometer, gyroscope, temperature sensor, pressure sensor, a transmitting unit, a receiving unit, a monitoring unit, a processor, and a memory. Functions and operations performed by the apparatus are described in details below.

As used herein, the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves and/or any such component that is well known in the art.

As used herein, the temperature-controlled unit may be a refrigerated container or reefer placed inside the vehicle. The temperature-controlled unit may contain goods.

As used herein, the server may be a remote storage, a database, a cloud or any such remote memory that is well known in the art.

As used herein, the network may be any cellular network (such as Global System for Mobile communication (GSM) network, Code-Division Multiple Access (CDMA) network, Long-Term Evolution (LTE) network), a WiFi network, a bluetooth network, a ZigBee network, a near-field communication network, or any such network that is obvious to a person skilled in the art.

Figure 1A:
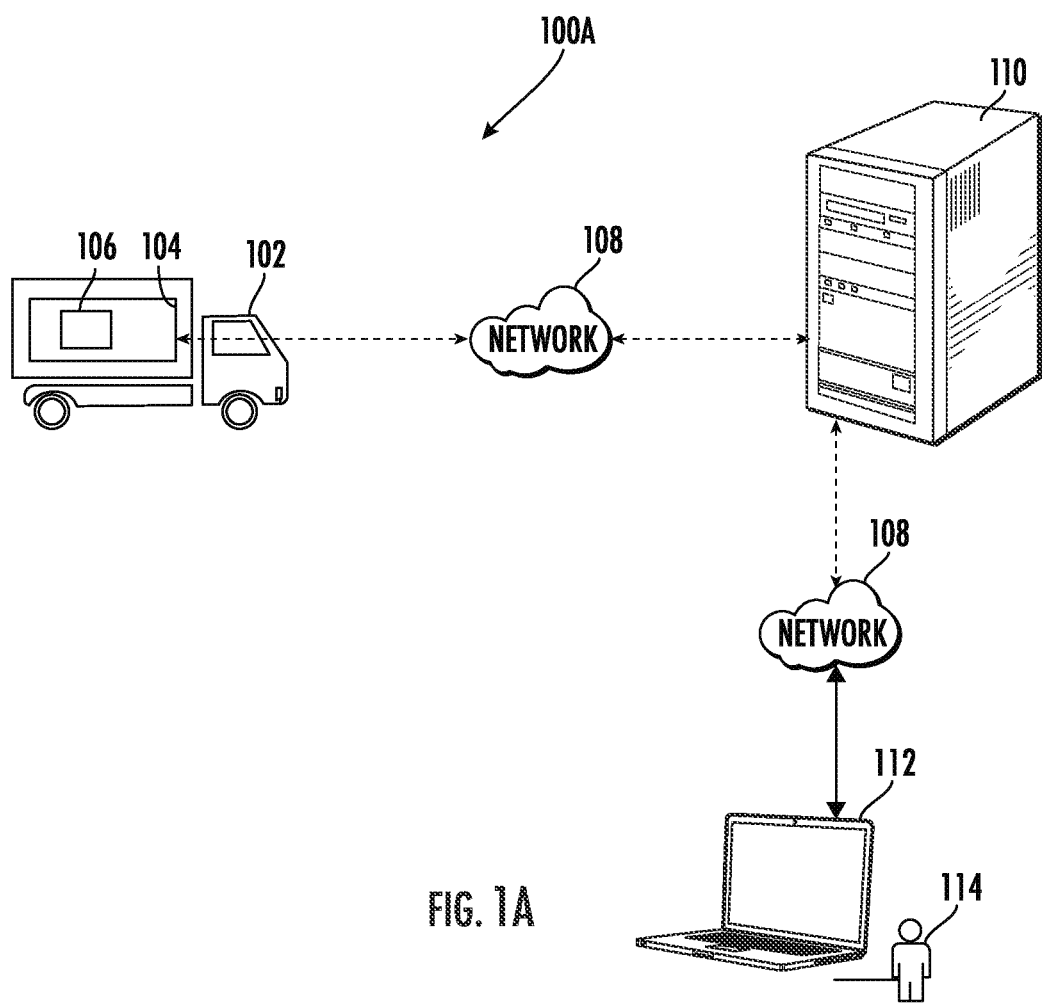
FIG. 1A depicts an exemplary system architecture according to an exemplary embodiment of the invention.

FIG. 1A depicts an exemplary system architecture 100A according to an exemplary embodiment of the invention. As depicted in FIG. 1A, a vehicle 102 may have a temperature-controlled unit 104 and an apparatus 106. In an exemplary embodiment, the apparatus 106 is integrated or embedded with the temperature-controlled unit 104. In another exemplary embodiment, the apparatus 106 is plugged-in to the temperature-controlled unit 104. The temperature-controlled unit 104 may also contain goods (not shown). The vehicle 102 carrying the goods inside the temperature-controlled unit 104 may be moved from one place to another place for transporting these goods.

During the transportation, the vehicle 102 may be accelerating or moving at a particular speed (say 40 miles per hour). Further, hard-brakes may be applied by a driver (not shown) of the vehicle 102 to avoid some collision or an accident. The application of the hard brakes results in sudden change or decrease in acceleration of the vehicle 102. For an instance, the speed of the vehicle 102 after the application of the hard-brakes may become 0.1 or 0 miles per hour.

Figure 1B:
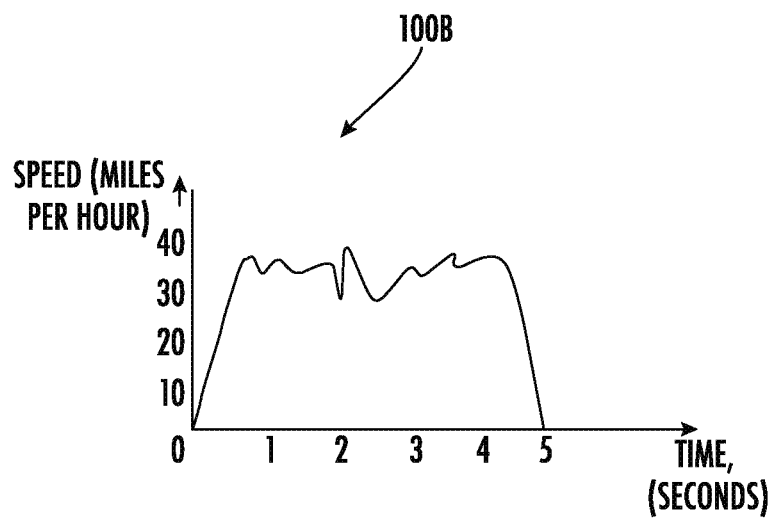
FIG. 1B depicts an exemplary graph showing a sudden change in acceleration of a vehicle.

Furthermore, the apparatus 106 may detect such sudden change or decrease in acceleration of the vehicle 102 using one or more sensors. In an exemplary embodiment, the one or more sensors correspond to a tri-axis accelerometer sensor and/or a gyroscope. Using the tri-axis accelerometer sensor together with the gyroscope may increase the accuracy for detecting the change in the acceleration. Further, in an exemplary embodiment, the sudden change or decrease in acceleration of the vehicle 102 may be detected when the speed of the vehicle 102 is suddenly decreased with very less fractions of seconds. FIG. 1B depicts an exemplary graph 100B showing a sudden decrease in the acceleration/speed of the vehicle 102 at 5th second where the speed is almost 0 miles per second whereas the speed is almost 40 miles per second at 4th second.

When the change or decrease in acceleration of the vehicle 102 is detected, the apparatus 106 may monitor one or more parameters associated with one or more components of the temperature-controlled unit 104. For this, various kinds of different sensors like pressure sensors, temperature sensors, voltage sensors, current sensors, air sensors, humidity sensors may be used for each components in the temperature-controlled unit 104 to monitor the one or more parameters associated with one or more components.

For an instance, a humidity level inside the temperature-controlled unit 104 may be monitored using a humidity sensor of the temperature-controlled unit 104. In another instance, pressure of a condenser of the temperature-controlled unit 104 may be monitored using a pressure sensor of the temperature-controlled unit 104. In another instance, a speed of a fan of the condenser, a compressor, an evaporator of the temperature-controlled unit 104 may be monitored using a speed sensor of the temperature-controlled unit 104. Similarly, current and voltage supplied to the temperature-controlled unit 104 may be monitored using a current sensor and a voltage sensor of the temperature-controlled unit 104.

In an exemplary embodiment, the one or more components of the temperature-controlled unit 104 comprise a compressor, an evaporator, a fan of the evaporator, heater coils, cooling coils, a condenser, fans of the condenser, a dry filter, a heat exchanger, a defrost magnetic valve, an engine, and/or stepper valves. In an exemplary embodiment, the one or more parameters comprises a temperature in the temperature-controlled unit, current supplied to the temperature-controlled unit, voltage at which the temperature-controlled unit is operated, current of a compressor of the temperature-controlled unit, a discharge pressure of the compressor, a suction pressure of the compressor, a discharge temperature of the compressor, a suction temperature of the compressor, an economizer pressure of an economizer valve, an economizer temperature of the of economizer valve, an outlet temperature of an evaporator of the temperature-controlled unit, an outlet pressure of the evaporator, a supply air temperature of the temperature-controlled unit, a return air temperature of the refrigeration unit, a humidity level inside the temperature-controlled unit, a position of a compressor suction modulation valve, a position of a evaporator expansion valve, a position of a clutch, a pressure of a condenser, a speed of a fan of the condenser, a speed of a fan of the evaporator, a display board temperature an input board temperature, a main board temperature, an output board temperature, a first stepper board temperature, a second stepper board temperature, a third stepper board temperature, a fourth stepper board temperature, a tachometer of an engine, a rotation per minute (RPM) sensor of the engine, a temperature of engine fuel, an intake temperature of engine, an intake pressure of engine, an injector pressure of engine and/or a defrost termination sensor reading. Although a limited number of components and the parameters are listed here; however, any other components and the parameters are also within the scope of the present invention.

The apparatus 106 may transmit information of the one or more monitored parameters to a server 110 through a network 108 after detecting change in acceleration. On receiving the information from the apparatus 106, the server 110 determine an impact on the one or more components of the temperature-controlled unit 104 due to the change in the acceleration of the vehicle 102. For this, the server 110 may use the information of the one or more monitored parameters by comparing the information of each parameter of the temperature-controlled unit 104 with predetermined values of the parameters. Such predetermined values of the parameters may be set or defined by a manufacturer of the temperature-controlled unit 104 and can be updated at the server 110 by any staff member of the manufacturer. In another exemplary embodiment, the predetermined values of the parameters may be obtained from data lake collection of the refrigeration parameters.

For an instance, current supplied to the temperature-controlled unit 104 before detection of the change in acceleration was 16 Amperes. And, the current provided to the temperature-controlled unit 104 after detection of the change in was 0.2 Amperes. The server 110 may determine that the current supplied to the temperature-controlled unit 104 has been stopped after the detection of the change in acceleration based on the comparison of the current supplied to the temperature-controlled unit 104 before and after the detection. In another example, speed of a fan of an evaporator before detection of the change in acceleration was 50 rotation per minute (rpm) and was 10 rpm after such detection. The server 110 may determine that the speed of the evaporator's fan of the temperature-controlled unit 104 has been decreased after the detection of the change in acceleration based on the comparison. Based on such comparison, the server 110 may determine that current supply and the evaporator's fan has been impacted after the detection of the change in acceleration of the vehicle. The deviation of the parameters from their customary values may represent the impact to the change in acceleration. The server may receive a set of values or in the form of a graphical representation.

Figure 1C:
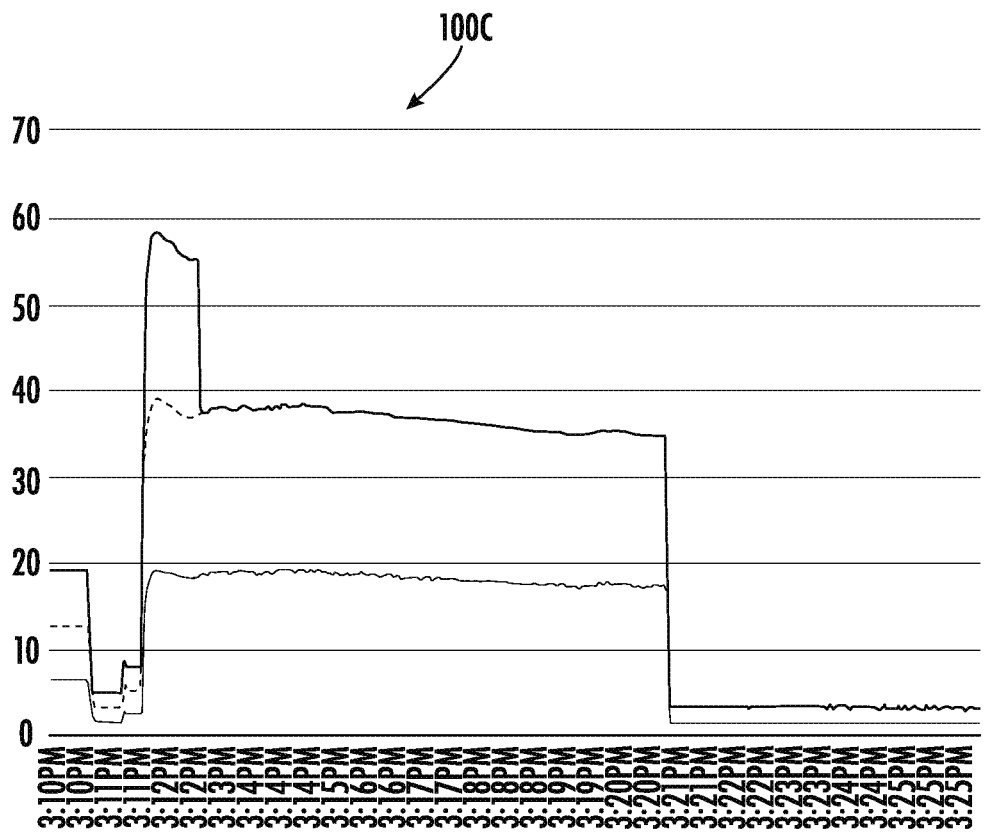
FIGS. 1C-1L depict graphs showing monitored parameters and impact on components of a vehicle.
Figure 1D:
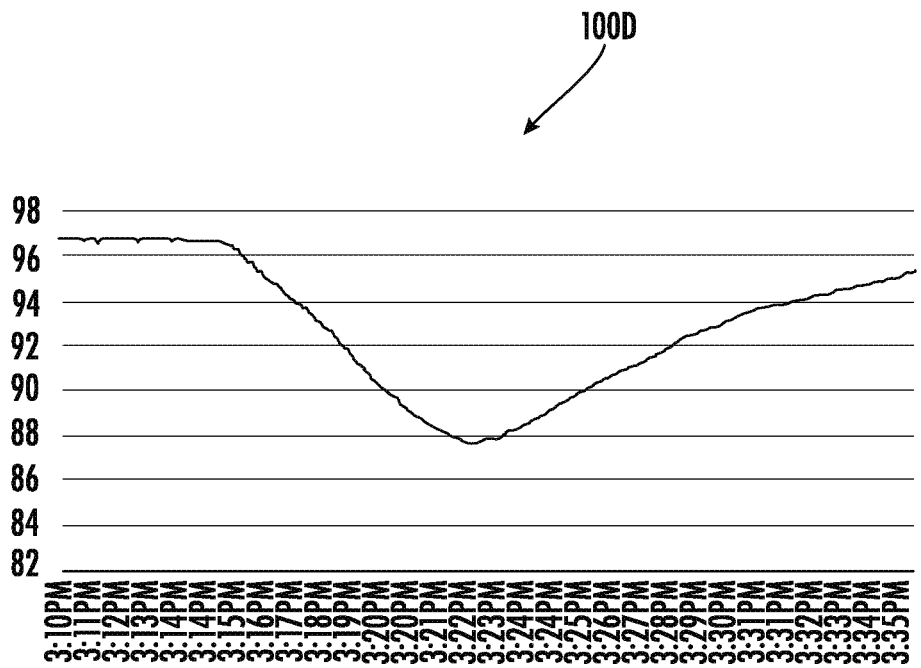
Figure 1E:
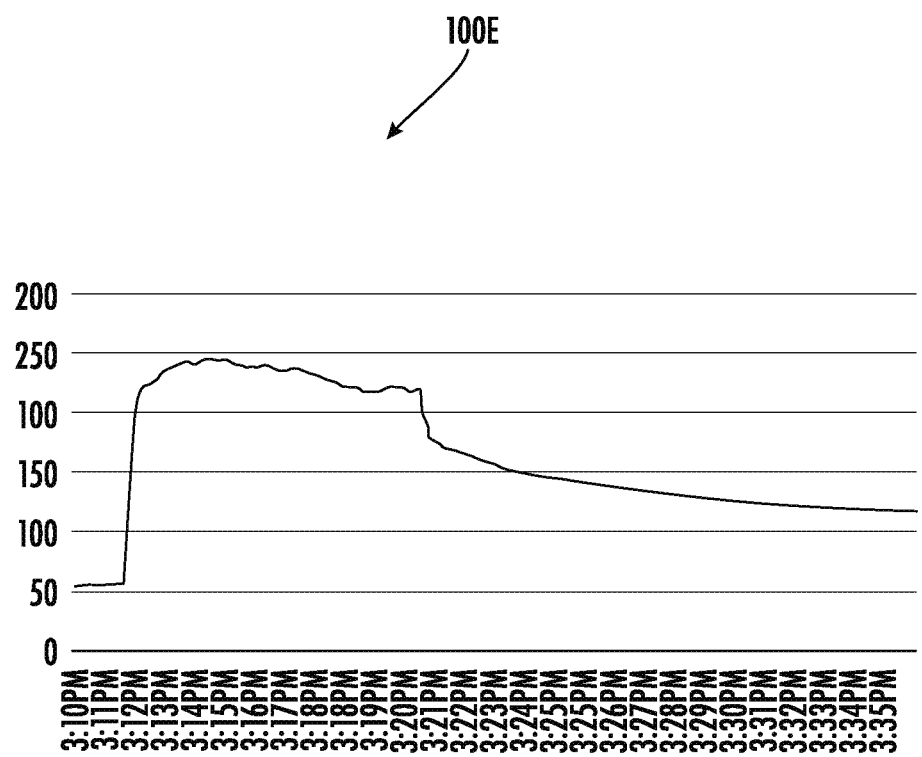
Figure 1F:
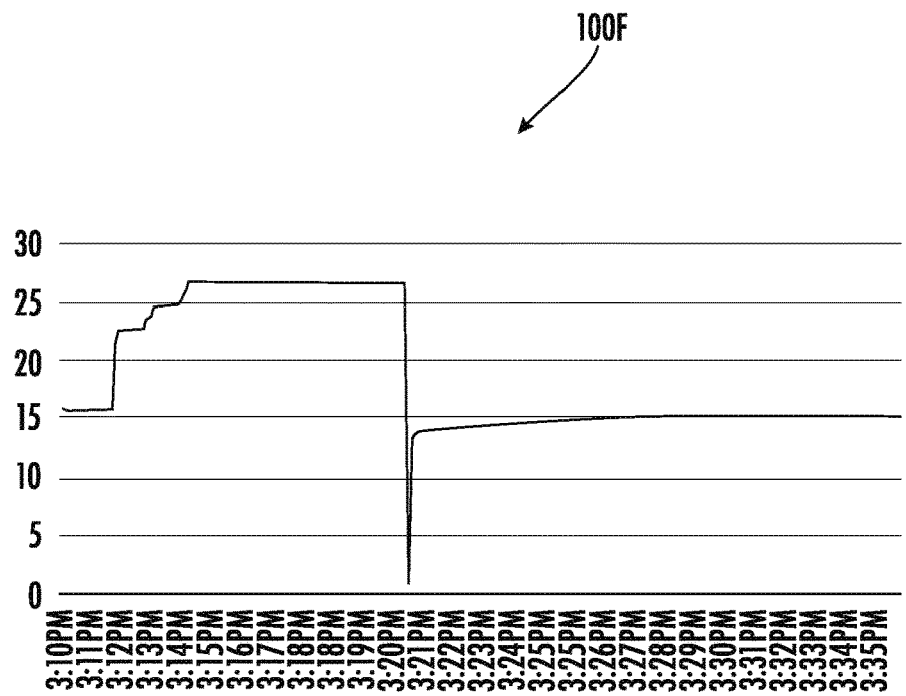
Figure 1G:
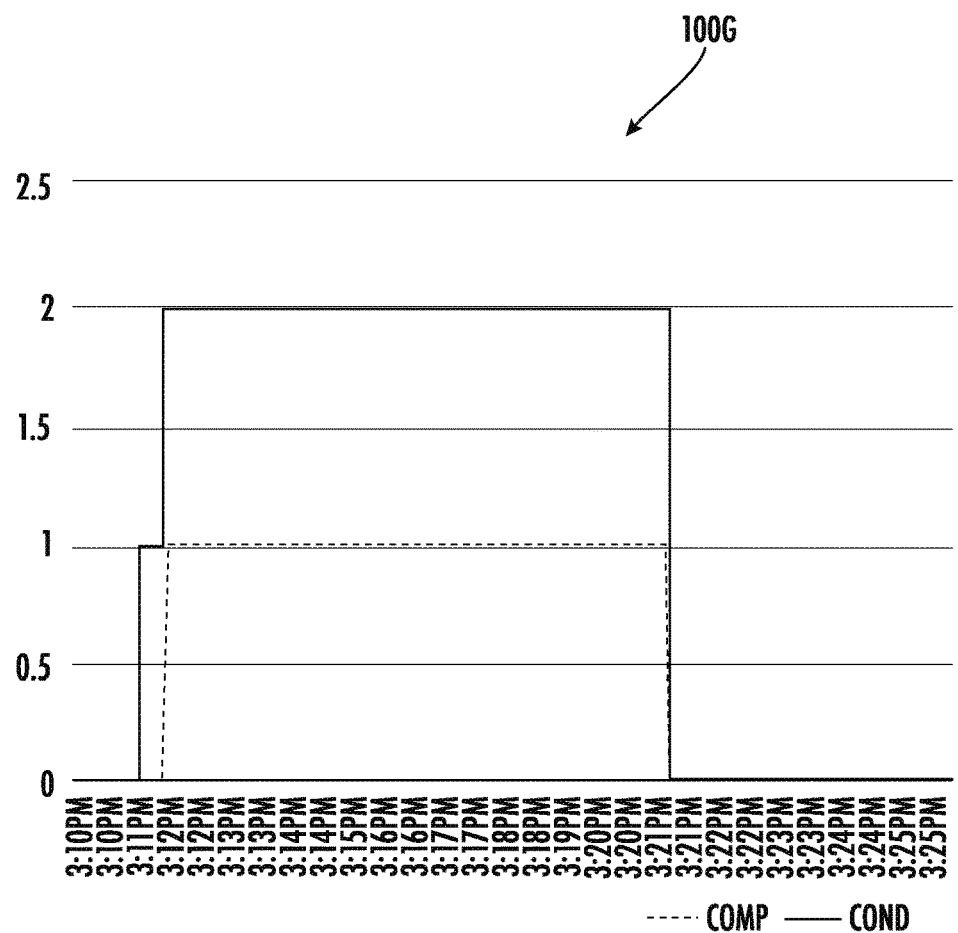
Figure 1H:
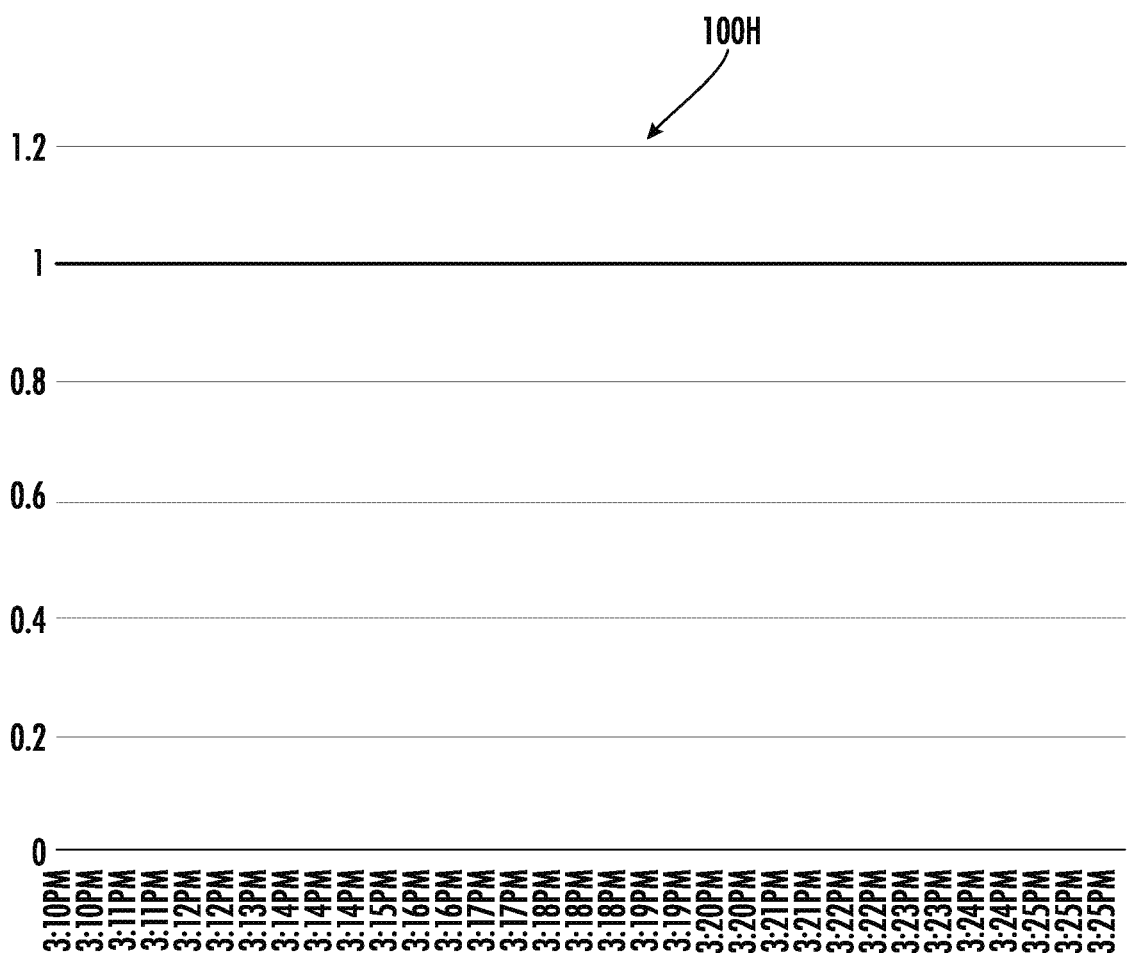
Figure 1I:
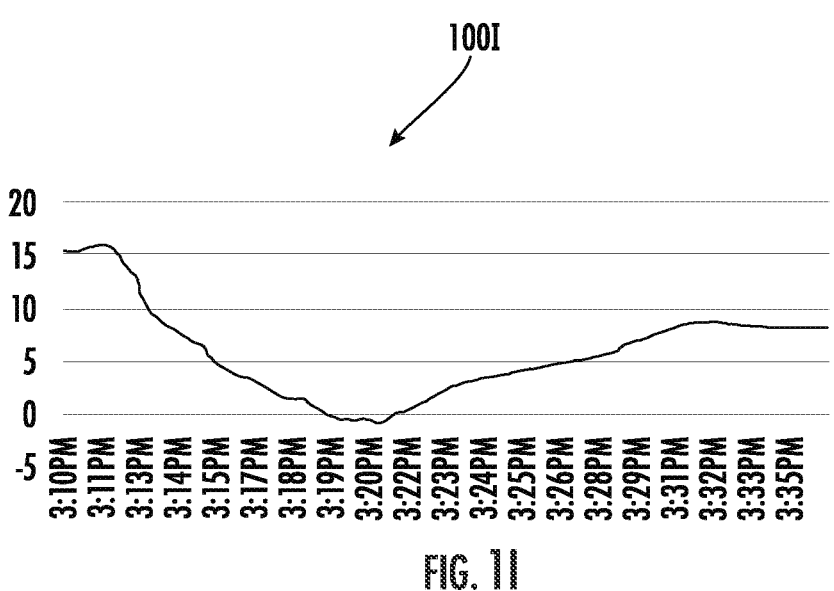
Figure 1J:
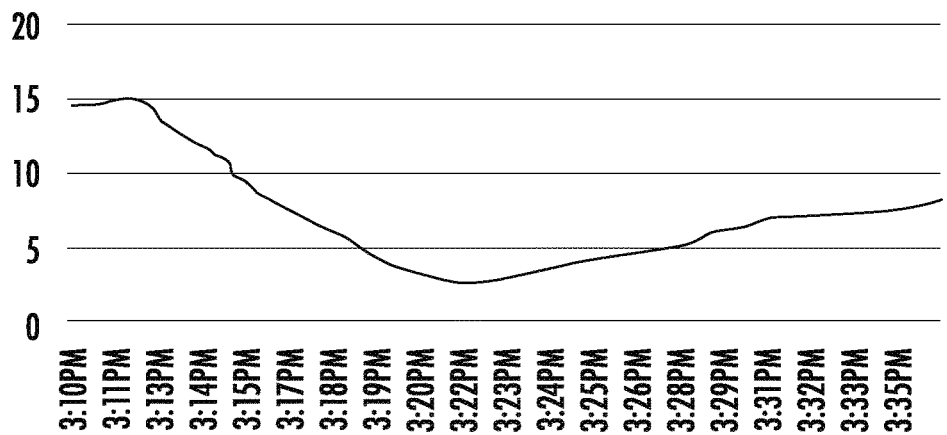
Figure 1K:
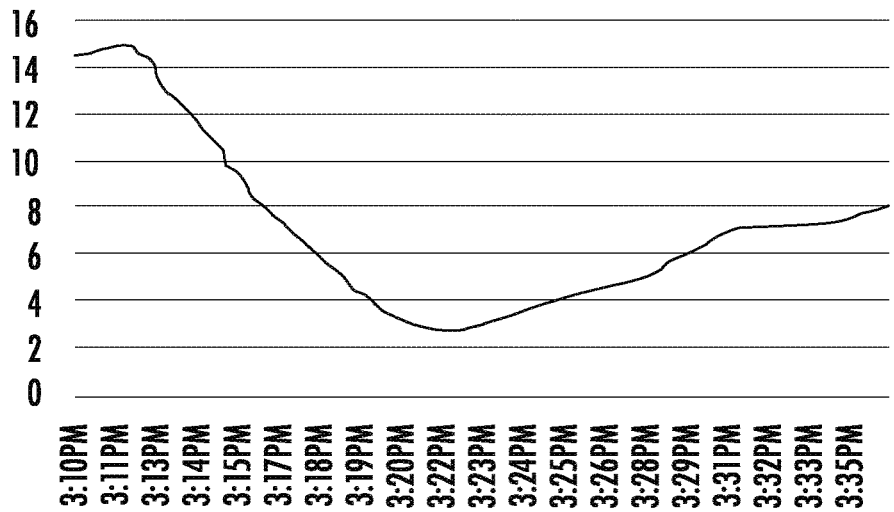
Figure 1L:
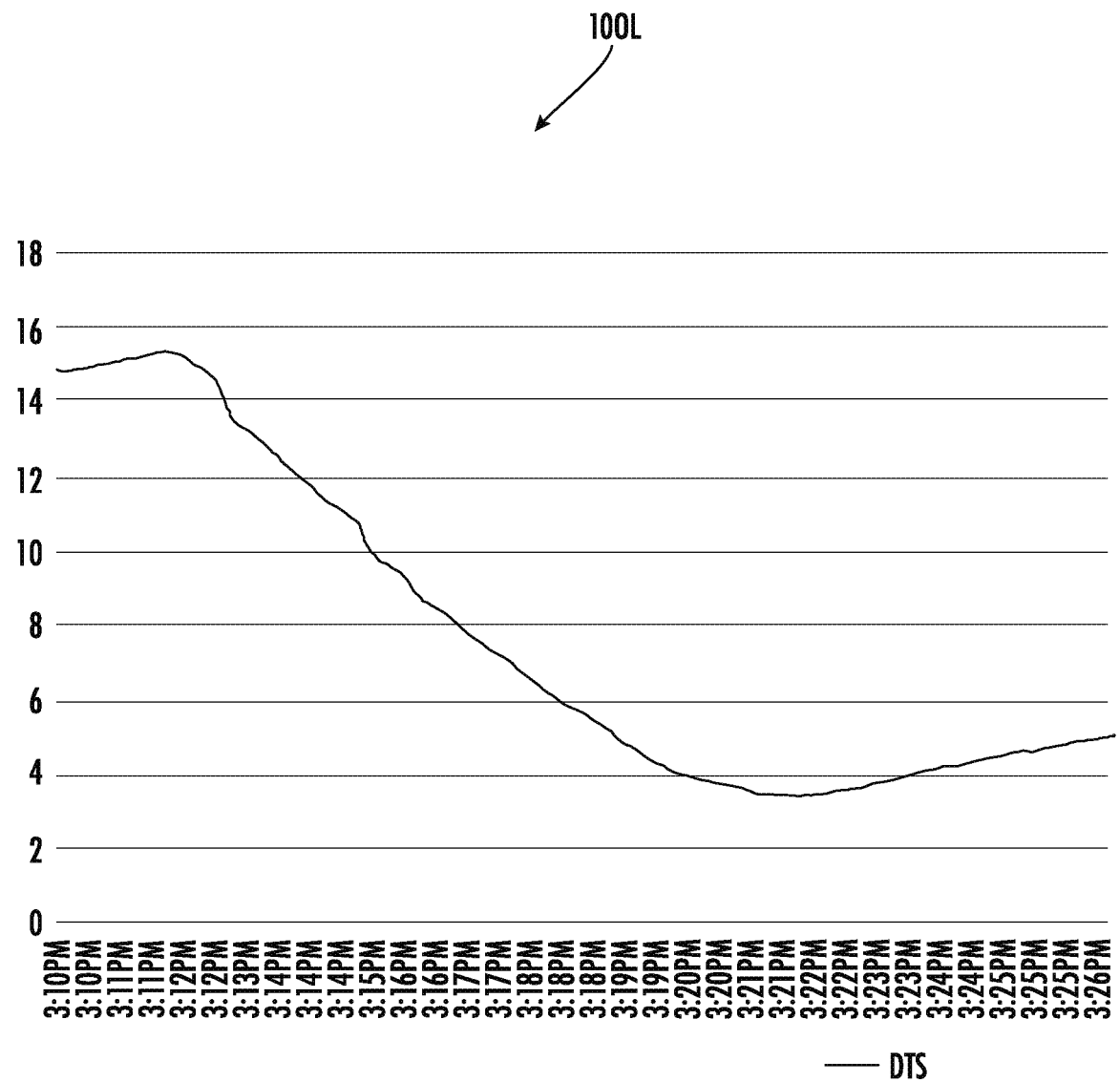

Consider an exemplary scenario that the change or decrease in acceleration of the vehicle 102 is detected at 03:21 PM. On detecting the change in acceleration at 03:21 PM, the parameters are monitored and accordingly, impact is determined. FIG. 1C depicts an exemplary graph 100C showing an impact on current at and after 03:21 PM. It can be seen in the exemplary graph 100C that AC Currents 1, 2, 3 before 3:21 PM is 18A, 37A, 37A respectively and after 3:21 PM, the AC Currents 1, 2, 3 is 1A, 2A, 2A. FIG. 1D depicts an exemplary graph 100D showing an impact on humidity level at 03:21 PM. It can be seen in the exemplary graph 100D that the relative humidity before 3:21 PM is 97% respectively and after 3:21 PM, the relative humidity is 88%. FIG. 1E depicts an exemplary graph 100E showing an impact on a condenser pressure at 03:21 PM. It can be seen in the exemplary graph 100E that the condenser pressure at 03:21 PM is 230 psi (pound per square inch) and after 03:21 PM, the condenser pressure is 170 psi. FIG. 1F depicts an exemplary graph 100F showing an impact on a suction modulation valve at 03:21 PM. It can be seen in the exemplary graph 100F that the suction modulation valve at 03:21 PM is 27% open and after 03:21 PM, the suction modulation valve is closed to 0% and then opens at 15%. FIG. 1G depicts an exemplary graph 100G showing an impact on a condenser fan and compressor at 03:21 PM. It can be seen in the exemplary graph 100G that the compressor and condenser fan goes off at 3:21 PM. FIG. 1H depicts an exemplary graph 100H showing no impact on an a low evaporator fan and a high evaporator fan at 03:21 PM. FIG. 1I depicts an exemplary graph 100I showing an impact on a supply air temperature at 03:21 PM. FIG. 1J depicts an exemplary graph 100J showing an impact on a return air temperature at 03:21 PM. It can be seen in the exemplary graphs 100I and 100J that the supply and return air temperatures were reducing before 3:21 PM but after 3:21 PM, they go on increasing because the compressor is off and the refrigeration is shut off. FIG. 1K depicts an exemplary graph 100K showing an impact on a secondary return temperature at 03:21 PM. FIG. 1L depicts an exemplary graph 100L showing an impact on a defrost termination sensor reading at 03:21 PM.

Based on the impact on the one or more components of the temperature-controlled unit 104 determined by the server 110, the server 110 may transmit a notification to a device 112 through the network 108. The device 112 may be associated with a person 114 who can be a driver of the vehicle, an owner of the manufacturer of the goods, an owner of the vehicle 102, an insurance provider, a hospital for emergency, a technician for repairing the vehicle 102, or any other service. By providing the notification to the device, a timely and an informed decision can be taken by the person 114.

Further, the server 110 may determine one or more faults in the temperature-controlled unit 104 based on the impact on the one or more components of the temperature-controlled unit 104. Taking the above example, the server 110 determines that the current supply and the evaporator's fan has become faulty as the current is not supplied to the temperature-controlled unit 104 and the evaporator's fan is not rotating and thus, has stopped providing air. Based on one or more determined faults in the temperature-controlled unit 104, the server 110 may automatically initiate a recovery process for the one or more components based on the one or more faults determined in the temperature-controlled unit 104. For an example, an automatic restart of the evaporator or the current source may be initiated by the server at the temperature-controlled unit 104. Such automated recovery process may help in early recovery from the damage or the impact of the change in acceleration.

The present invention encompasses the server 110 to store the information related to the detection of the change in acceleration and/or the information of one or more parameters associated with the one or more components in a memory for future. The information is saved in the memory with date, time, year of the detection of the change in acceleration and can be helpful in legal case scenario. In an event the server 110 determines that there is no impact caused on the one or more components of the temperature-controlled unit 104 due to the change in the acceleration, the server 110 may erase such information.

Figure 2:
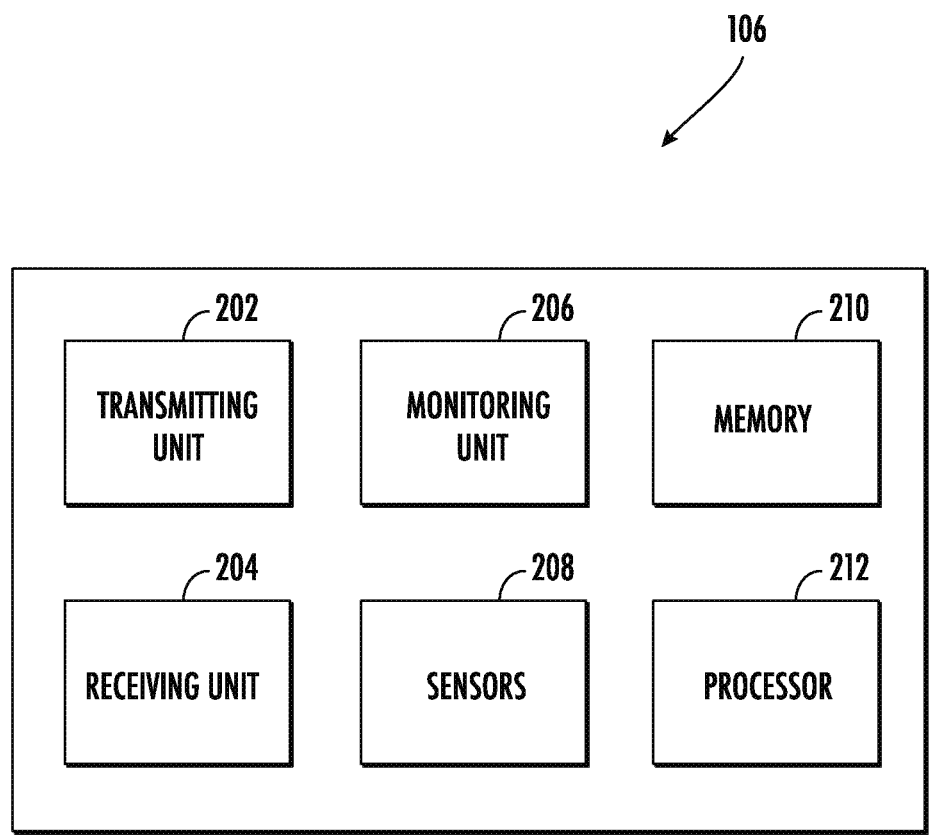
FIG. 2 depicts block diagram of different components of an exemplary apparatus according to an exemplary embodiment of the invention

FIG. 2 depicts block diagram of different components of an exemplary apparatus 106 according to an exemplary embodiment of the invention. The apparatus 106 may comprise of, but is not limited to, a transmitting unit 202, a receiving unit 204, a monitoring unit 206, one or more sensors 208, a memory 210, and/or a processor 212. The one or more sensors 208 may include, but is not limited to, pressure sensors, temperature sensors, voltage sensors, current sensors, air sensors, humidity sensors, a tri-axis accelerometer, and a gyroscope. As discussed above, the tri-axis accelerometer and/or the gyroscope sensors may be configured to detect a change in acceleration of a vehicle 102. The monitoring unit 206 may be configured to monitor one or more parameters associated with one or more components of the temperature-controlled unit 104 using the rest of the sensors as explained above. Further, the transmitting unit 202 may be configured to transmit information of the one or more monitored parameters to a server 110 to determine an impact on the one or more components of the temperature-controlled unit 104 due to the change in the acceleration. The receiving unit 204 may be configured to receive any communication from the server 110. The memory 210 may be configured to store information of the one or more monitored parameters as monitored by the sensors. The processor 212 may be configured to read values from the sensors 208, read information from the monitoring unit 206 and read information from the memory 210.

Moreover, the transmitting unit 202, the receiving unit 204, the monitoring unit 206, the one or more sensors 208, and/or the memory 210 may be communicably coupled with the processor 212. The different units described herein are exemplary. The invention may be performed using one or more units. For example, the tasks executed by the transmitting unit 202, the receiving unit 204, the monitoring unit 206, the one or more sensors 208, and/or the memory 210 and/or the processor 212 may be performed by a single unit. Alternatively, more number of units as described herein may be used to perform the present invention.

Figure 3:
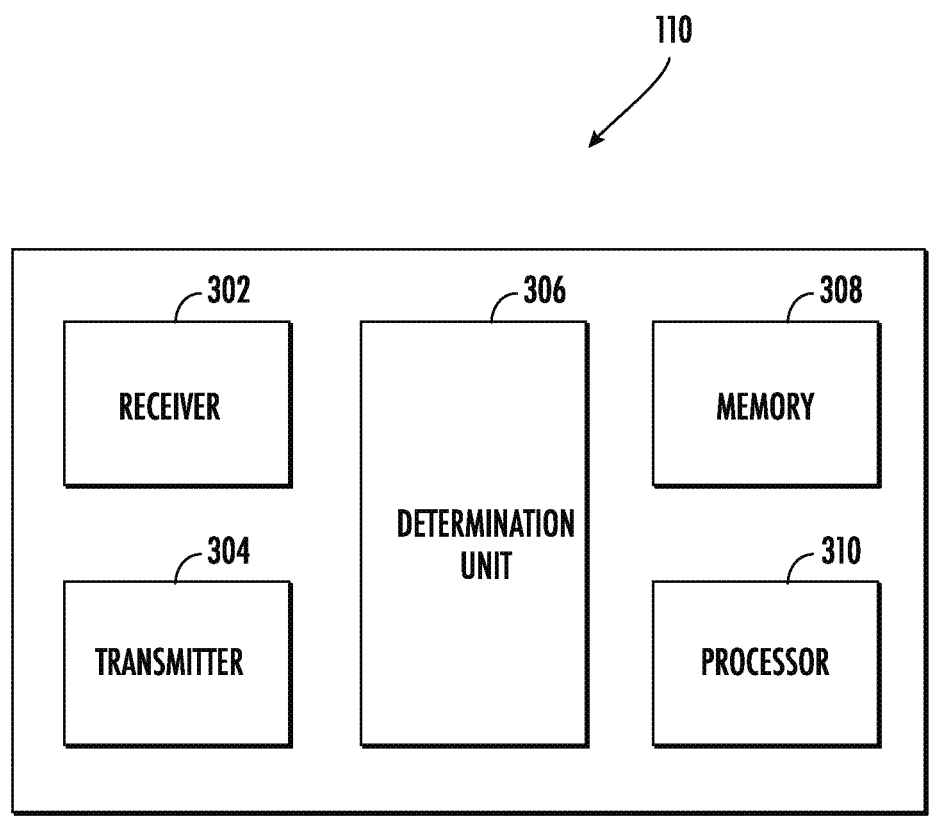
FIG. 3 depicts block diagram of different components of an exemplary server according to an exemplary embodiment of the invention.

FIG. 3 depicts block diagram of different components of an exemplary server 110 according to an exemplary embodiment of the invention. The server 110 may comprise of, but is not limited to, a receiver 302, a transmitter 304, a determination unit 306, a memory 308, and/or a processor 310. The receiver 302 may be configured to receive information of one or more parameters associated with one or more components of a temperature-controlled unit 104 of a vehicle 102. Also, the information of the one or more parameters are received in response to a change in acceleration of the vehicle 102. The determination unit 306 may be configured to determine an impact on the one or more components of the temperature-controlled unit 104 due to the change in the acceleration. For this, the determination unit 306 may communicate with the processor 310 to perform comparison as explained above. The transmitter 304 may be configured to transmit a notification to a device 112 based on the impact on the one or more components of the temperature-controlled unit 104. The memory 308 may be configured to store information related to the detection of the change in acceleration and/or the one or more parameters associated with the one or more components. The memory 308 and the processor 310 may be configured to erase the information from the memory in an event no impact is determined on the one or more components of the temperature-controlled unit 104 due to the change in the acceleration.

Moreover, the receiver 302, the transmitter 304, the determination unit 306, the memory 308 may be communicably coupled with the processor 310. The different units described herein are exemplary. The invention may be performed using one or more units. For example, the tasks executed by the receiver 302, the transmitter 304, the determination unit 306, the memory 308 and/or the processor 310 may be performed by a single unit. Alternatively, more number of units as described herein may be used to perform the present invention.

Figure 4:
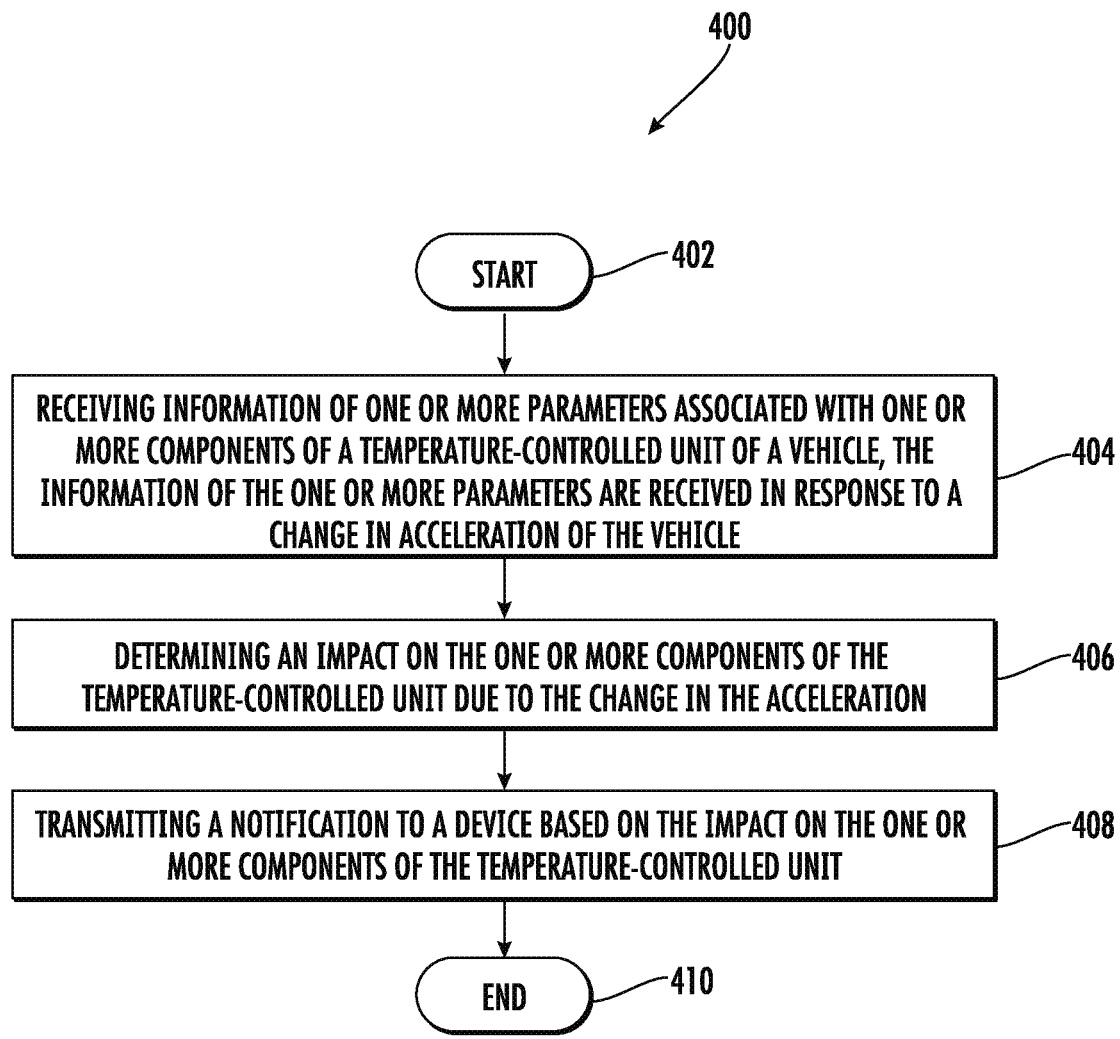
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method for determining an impact on components of a temperature-controlled unit of a vehicle 102. The method flowchart 400 starts at step 402.

At step 404, a server 110 may receive information of one or more parameters associated with one or more components of a temperature-controlled unit 104 of a vehicle 102. Further, the information of the one or more parameters are received in response to a change in acceleration of the vehicle 102. This has been discussed in greater details in FIG. 1A above.

At step 406, the server 110 may determine an impact on the one or more components of the temperature-controlled unit 104 due to the change in the acceleration. This has been discussed in greater details in FIG. 1A above.

At step 408, the server 110 may transmit a notification to a device 112 based on the impact on the one or more components of the temperature-controlled unit 104. This has been discussed in greater details in FIG. 1A above. Then, the method 400 may end at step 410.

In one embodiment of the invention, the invention can be operated using the one or more computer readable devices. The one or more computer readable devices can be associated with an apparatus 106. A computer readable medium comprises one or more processors and a memory coupled to the one or more processors, the memory stores instructions executed by the one or more processors. The one or more processors is configured to detect a change in acceleration of a vehicle 102. Also, the one or more sensors associated with a temperature-controlled unit 104 of the vehicle 102. The one or more processors is also configured to monitor one or more parameters associated with one or more components of the temperature-controlled unit 104 in response to detection of the change in the acceleration. The one or more processors is also configured to transmit information of the one or more monitored parameters to a server 110 to determine an impact on the one or more components of the temperature-controlled unit 104 due to the change in the acceleration.

The present invention is applicable in various industries/fields such as pharmaceutical industry, transportation industry, delivery management industry, manufacturing, distribution and packaging industry and any such industry/field that is well known in the art and where the apparatus 106 is used.

The embodiments of the invention discussed herein are exemplary and various modification and alterations to a person skilled in the art are within the scope of the invention.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "controller" can refer to substantially any processor or computing processing unit or device comprising, but not limited to comprising, a direct digital control of a HVAC system, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving information of one or more parameters associated with one or more components of a temperature-controlled unit of a vehicle having at least four wheels, the information of the one or more parameters received in response to a change in acceleration of the vehicle;
   determining an impact on the one or more components of the temperature-controlled unit due to the change in the acceleration of the vehicle in response to braking of the vehicle causing a deceleration of the vehicle; and
   transmitting a notification to a device based on the impact on the one or more components of the temperature-controlled unit.

2. The method of claim 1, further comprising, determining one or more faults in the temperature-controlled unit based on the impact on the one or more components of the temperature-controlled unit.

3. The method of claim 2, wherein the one or more faults are determined by comparing information of each parameter of the temperature-controlled unit with predetermined values of the parameters.

4. The method of claim 2, further comprising, automatically initiating a recovery process for the one or more components based on the one or more faults determined in the temperature-controlled unit.

5. The method of claim 1, further comprising, storing information related to the detection of the change in acceleration and/or the one or more parameters associated with the one or more components in a memory; and
   erasing the information from the memory in an event no impact is determined on the one or more components of the temperature-controlled unit due to the change in the acceleration.

6. The method of claim 1, wherein the one or more parameters associated with the one or more components are monitored by the temperature-controlled unit of the vehicle.

7. The method of claim 1, wherein the change in acceleration of the vehicle is detected using one or more sensors associated with the temperature-controlled unit.

8. The method of claim 1, wherein the one or more sensors correspond to a tri-axis accelerometer sensor and a gyroscope.

9. The method of claim 1, wherein the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

10. A server comprising:
    a receiver configured to receive information of one or more parameters associated with one or more components of a temperature-controlled unit of a vehicle having at least four wheels, the information of the one or more parameters received in response to a change in acceleration of the vehicle;
    a determination unit configured to determine an impact on the one or more components of the temperature-controlled unit due to the change in the acceleration of the vehicle in response to braking of the vehicle causing a deceleration of the vehicle; and
    a transmitter configured to transmit a notification to a device based on the impact on the one or more components of the temperature-controlled unit.

11. The server of claim 10, wherein the determination unit is further configured to determine one or more faults in the temperature-controlled unit based on the impact on the one or more components of the temperature-controlled unit.

12. The server of claim 11, wherein the one or more faults are determined by comparing information of each parameter of the temperature-controlled unit with predetermined values of the parameters.

13. The server of claim 10, wherein the change in acceleration of the vehicle is detected using one or more sensors associated with the temperature-controlled unit, wherein the one or more sensors correspond to a tri-axis accelerometer sensor and a gyroscope.

14. The server of claim 10, wherein the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

15. An apparatus comprising:
    one or more sensors configured to detect a change in acceleration of a vehicle having at least four wheels, the one or more sensors associated with a temperature-controlled unit of the vehicle;
    a monitoring unit configured to monitor one or more parameters associated with one or more components of the temperature-controlled unit in response to detection of the change in the acceleration of the vehicle in response to braking of the vehicle causing a deceleration of the vehicle; and
    a transmitting unit configured to transmit information of the one or more monitored parameters to a server to determine an impact on the one or more components of the temperature-controlled unit due to the change in the acceleration.

16. The apparatus of claim 15, wherein the one or more sensors associated with the temperature-controlled unit correspond to a tri-axis accelerometer sensor and a gyroscope.

17. The apparatus of claim 15, wherein the one or more components of the temperature-controlled unit comprise a compressor, an evaporator, a fan of the evaporator, heater coils, cooling coils, a condenser, fans of the condenser, a dry filter, a heat exchanger, a defrost magnetic valve, and/or stepper valves.

* * * * *